United States Patent [19]

Shimazaki et al.

[11] 4,303,548

[45] Dec. 1, 1981

[54] PROCESS FOR COATING DISPERSED MINUTE DROPLETS WITH MEMBRANE

[75] Inventors: Tetsuro Shimazaki; Shun Kamei, both of Tokyo, Japan

[73] Assignee: Mitsubishi Paper Mills, Ltd., Tokyo, Japan

[21] Appl. No.: 52,926

[22] Filed: Jun. 28, 1979

[30] Foreign Application Priority Data

Jul. 5, 1978 [JP] Japan ................................ 53-81793

[51] Int. Cl.$^3$ .............................................. B01J 13/02
[52] U.S. Cl. .................................... 252/316; 282/27.5; 424/32; 427/151; 427/152; 428/307; 428/914
[58] Field of Search ............................ 252/316; 424/32

[56] References Cited

U.S. PATENT DOCUMENTS

| 3,516,914 | 6/1970 | Matson | 252/316 |
| 3,993,831 | 11/1976 | Vassiliades | 428/307 |
| 4,001,140 | 1/1977 | Foris et al. | 252/316 |
| 4,157,983 | 6/1979 | Golden | 252/316 |

FOREIGN PATENT DOCUMENTS 46-30282  3/1971  Japan ................................. 252/316

Primary Examiner—Richard D. Lovering
Attorney, Agent, or Firm—Cushman, Darby & Cushman

[57] ABSTRACT

Microcapsules containing water-insoluble liquid, of which wall membrane is urea-formaldehyde resin is produced by the addition of a water-soluble organic acid, urea and formaldehyde to an emulsion of the liquid, which is made by a nonionic emulsifier and heating the emulsion to effect the polycondensation of urea and formaldehyde.

7 Claims, No Drawings

PROCESS FOR COATING DISPERSED MINUTE DROPLETS WITH MEMBRANE

This invention relates to a process for coating dispersed minute droplets with thin film (membrane) to seclude the dispersed phase from the dispersion medium. This process is very useful in coating minute droplets containing dispersed phase and a substance soluble therein. This is also a process for insulating the dispersed phase from the dispersion medium and other environmental influences, which has such unprecedented features that, for example, large amounts of unreacted polymerizable substances are not left behind in both the dispersed phase and the dispersion medium.

There have heretofore been known various processes for coating minutely dispersed droplets with membrane, including, for example, the following famous processes.

(1) Methods of forming a concentrated polymer phase by phase separation from an aqueous polymer solution by changing various physico-chemical conditions or other means to coat the dispersed phase with said polymer (U.S. Pat. Nos. 2,800,457; 2,800,458; etc.)

(2) Methods of coating the dispersed phase by polymerizing at the inferface of minutely dispersed droplets a substance A having a strong affinity for the dispersed phase and a weak affinity for the dispersion medium had a substance B having a strong affinity for the dispersion medium and a weak affinity for the dispersed phase (Japanese Patent Publication Nos. 446/67; 2,882/67; 2,883/67, etc.).

(3) Methods of coating the dispersed phase by the formation or coalescence of a polymer from a substance supplied by either the dispersed phase or the dispersion medium (Japanese Patent Publication Nos. 9,168/61; 23,165/72; Japanese Patent Application Laid-Open ("Kokai") Nos. 57,892/73; 9,079/76, etc.).

The method of this invention herein described falls certainly into the third of the above three groups. As compared with the methods of first and second groups, the methods of third group have advantages in that the ratio of dispersed phase to dispersion medium can be far more freely selected than in the methods of first group; the thickness and strength of the coating membrane can be more freely selected than in the methods of first and second groups; and the proportion of coating material or coating material precursors remained in the dispersed phase or dispersion medium is less than that in the methods of second group.

The conventional methods of the third group, however, have disadvantages in that some of the methods need to prepare separately urea-formaldehyde pre-polycondensate or the like to be used in preparing the dispersion and complicate the operation, because the procedure of preparing said pre-polycondensate is necessary in addition to the membrane formation (Japanese Patent Publication No. 23,165/72; Japanese Patent Application Laid-Open No. 66,878/77, etc.); in some other methods, since the formation of membrane depends on the coalescence of a polyhydroxyphenol and polyvinyl alcohol used as emulsifier, there is no room for the choice of emulsifier, in addition, the dispersion discolors, and the reaction proceeds efficiently only at a pH less than 2 (Japanese Patent Application Laid-open, No. 57,892/73, etc.); in still other methods, a specific emulsifier is required in forming membrane at the interface between the dispersed phase and the dispersion medium and the viscosity of the dispersion varies markedly with pH (Japanese Patent Application Laid-open No. 9079/76).

According to this invention, by the incorporation of a low molecular organic acid as an aid to coat the droplets with membrane, it has become possible to use a nonionic emulsifier which has heretofore been considered unusable in this case and to use urea, thus resulting in a number of advantages including those listed below:

In preparing a dispersion, since the type and concentration of dispersant can be selected from very broad ranges, it is possible to employ proper type and concentration of the dispersant in accordance with the type of solvent used and the intended particle size of the dispersion; the membrane strength can be varied by the addition of a suitably selected organic acid in selected amounts to control the amount and composition of the substance which forms the membrane; in case it is required to carry out the reaction at a pH suitable for the substances added to the dispersion medium or for other additives, a suitable pH can be selected from a range broader than in conventional methods. As compared with conventional methods, in this method because of the above advantageous features it is possible, by a simpler procedure and in a shorter period of time, to prepare minute droplets having a particle diameter selected from a broader range and coated with membrane of a strength selected from a broader range by properly selecting pH, temperature and the ratio of dispersion medium to dispersed phase from broader ranges.

In carrying out the process of this invention, the addition of organic acids is very important, whereas the type of organic acid is not so important and can be selected quite freely if the added amount is suitably adjusted. The organic acid used in this process can be in the form of either free acid or salt, both having the same effect as an aid for coating droplets with membrane. Although mineral acids are excluded from use, any of the organic carboxylic acids, organosulfur acids such as organic sulfonic acids organic sulfinic acids and organic sulfenic acids, and organophosphorus acids such as organic phosphonic acids and organic phosphinic acids can be used. Of these, carboxylic acids are most desirable in view of easy availability of analogous acids, relatively wide range of optimal amount to be added, and minor dispersant effect. The carboxylic acids usable in the process of this invention are those belonging to any family of the aliphatic carboxylic acids, aromatic carboxylic acids, monocarboxylic acids, polybasic carboxylic acids, and aminocarboxylic acids. However, they must be soluble in the dispersion. From various experimental results, it was found that when the number of carbon atoms in a carboxylic acid is larger than a certain limit, coating of the droplet with membrane becomes very difficult. A general tendency is that a polybasic carboxylic acid capable of coating the droplet with membrane has smaller number of carbon atoms than those of monocarboxylic acid. The carboxylic acid for use in the process of this invention should have 0 to 19 carbon atoms per carboxyl group and a total number of 20 or less.

Carboxylic acids in the above-noted carbon atom number range are acrylic acid, aconitric acid, adipic acid, ascorbic acid, aspartic acid, aceturic acid, acetylsalicyclic acid, acetylenedicarboxylic acid, acetamidobenzoic acid, acetophenonecarboxylic acid, acetonedicarboxylic acid, azelaic acid, 2,2-azobenzenedicarboxylic acid, atropic acid, atrolactic acid, anisic acid, aminobenzoic acid, aminoisovaleric acid, aminovaleric acid, aminocinnamic acid, aminosalicyclic acid, aminonitrobenzoic acid, aminophenylpropionic acid, aminobutyric acid, arachic acid, alanine, araboascorbic acid, arabonic acid, alanturic acid, allylacetic acid, allylmalonic acid, arginine, arsanilic acid, arecaidine, alloxantinic acid, allocinnamic acid, angelic acid, benzoic acid, anthracenecarboxylic acid, anthranilic acid, isoascorbic acid, isocaproic acid, isocamphoronic acid, isovaleric acid, isocrotonic acid, isocamphoric acid, isoserine, isosaccharic acid, isoncotic acid, isovanillic acid, iso-phthalic acid, isopropylidenesuccinic acid, isobutyric acid, isoleucine, itaconic acid, iminodiacetic acid, indolylacetic acid, undecanoic acid, undecenoic acid, ethylbenzoic acid, ethylmalonic acid, ethylbutyric acid, ethoxyacetic acid, enanthic acid, epoxystearic acid, elaidic acid, oleostearic acid, euxanthic acid, eugetic acid, oxanilic acid, oxanilic acid-o-carboxylic acid, oxalacetic acid, hydroxybenzoic acid, hydroxyisophthalic acid, hydroxyisopropylbenzoic acid, 2-hydroxy-3-isopropyl-6-methylbenzoic acid, hydroxyisobutyric acid, 4-hydroxyquinoline-2-carboxylic acid, hydroxyglutamic acid, hydroxycinnamic acid, 2-hydroxyterephthalic acid, hydroxytoluic acid, hydroxynaphthoic acid, 5-hydroxy-1,4-pyrone-2-carboxylic acid, 3-hydroxy-1,4-pyrone-2,6-dicarboxylic acid, hydroxyphenylacetic acid, hydroxyphthalic acid, 4-hydroxy-L-proline, 4-hydroxy-3-methoxycinnamic acid, hydroxybutyric acid, α-oxobutyric acid, trans-11-octadecen-9-ic acid, opianic acid, L-ornithine, oleic acid, caprylic acid, capric acid, caproic acid, galacturonic acid, galactonic acid, o-carboxycinnamic acid, gallic acid, galloylgallic acid, camphanic acid, d-camphoric acid, 1-camphoronic acid, formic acid, valeric acid, quinic acid, quinardic acid, quinolinecarboxylic acid, quinolinedicarboxylic acid, citric acid, 2-coumarone-carboxylic acid, glyoxylic acid, glycocyamine, glycolic acid, glycidic acid, glycylglycine, glycine, glyceric acid, glucuronic acid, gluconic acid, glutaconic acid, glutamic acid, glutaric acid, crotonic acid, chloroacrylic acid, chlorobenzoic acid, chloroisocrotonic acid, chlorocrotonic acid, chlorosuccinic acid, chloroacetic acid, chlorosalicylic acid, chlorophthalic acid, chlorofumaric acid, chloropropionic acid, chloromaleic acid, cinnamic acid, erythrocinnamic acid dibromide, succinic acid, acetic acid, sarcosine, santonic acid, diaminobenzoic acid, cyanoacetic acid, diethylacetic acid, diethoxalic acid, dihydroxybenzoic acid, dihydroxycinnamic acid, dihydroxytartaric acid, 8,9-dihydroxystearic acid, 2,5-dihydroxyterephthalic acid, 4′,4″-dihydroxytriphenylmethane-2-carboxylic acid, 2,5-dihydroxyphenylacetic acid, dihydroxyphthalic acid, 2,4-dihydroxy-6-methylbenzoic acid, diglycolic acid, cyclobutanecarboxylic acid, cyclopropanecarboxylic acid, 1,1-cyclopropanedicarboxylic acid, cyclohexanecarboxylic acid, cyclohexanedicarboxylic acid, 1-cyclohexene-1,4-dicarboxylic acid, cyclopentanedicarboxylic acid, dichlorobenzoic acid, dichloroacetic acid, 3,5-dichlorosalicylic acid, dichlorophthalic acid, dichloropropionic acid, dithioglycolic acid, citraconic acid, citramalic acid, citrulline, dinitrobenzoic acid, cineole acid, diphenylacetic acid, dibromobenzoic acid, dibromosuccinic acid, dibromoacetic acid, dibromopropionic acid, dimethylaminobenzoic acid, dimethylbenzoic acid, dimethylsuccinic acid, dimethylfuranecarboxylic acid, dimethylmalonic acid, dimethoxyphthalic acid, chaulmoogric acid, oxalic acid, tartaric acid, camphoroxalic acid, camphorcarboxylic acid, camphoric acid, cinnamylideneacetic acid, succinamide acid, stearic acid, stearoxylic acid, stearolic acid, suberic acid, sulfamoylbenzoic acid, sulfobenzoic acid, sulfoacetic acid, 5-sulfosalicyclic acid, sebacic acid, serine, cerotic acid, sorbic acid, tartronic acid, thioglycolic acid, thiosalicyclic acid, thiophenecarboxylic acid, tiglic acid, desoxalic acid, tetrachlorophthalic acid, tetrahydroterephthalic acid, tetrahydrophthalic acid, tetramethylsuccinic acid, tetrolic acid, terpenylic acid, terebic acid, terephthalic acid, saccharic acid, trichlorobenzoic acid, trichloroacetic acid, triphenylacetic acid, triphenylmethane-2-carboxylic acid, trifluoroacetic acid, tribromoacetic acid, trimethylbenzoic acid, trimethylacetic acid, trimethoxybenzoic acid, toluic acid, toluxylic acid, threonine, tropic acid, tropinic acid, 1,2-naphthalenedicarboxylic acid, naphthalic acid, naphthylaminesulfonic acid, α-naphthylacetic acid, α-naphthoic acid, β-naphthoic acid, nicotic acid, nitrilotriacetic acid, nitrobenzoic acid, 5-nitroisophthalic acid, o-nitrocinnamic acid, nitrosalicyclic acid, o-nitrosobenzoic acid, nitroterephthalic acid, nitrophenylpropiolic acid, nitrophthalic acid, lactic acid, mucic acid, L-norleucine, hippuric acid, vanillic acid, paraconic acid, L-valine, palmitic acid, pantothenic acid, hydantoic acid, 2,2′-hydrazobenzoic acid, hydroacrylic acid, hydraatropic acid, p-hydrocoumaric acid, hydrocinnamic acid, hydrochelidonic acid, pinaconic acid, vinylacetic acid, biphenylcarboxylic acid, biphenyldicarboxylic acid, piperic acid, piperonylic acid, pimelic acid, 2-pyridinecarboxylic acid, pyridinedicarboxylic acid, pyridinetricarboxylic acid, pyridine-pentacarboxylic acid, biliverdin acid, pyruvic acid, pyrogallol-4-carboxylic acid, 2-pyrrolecarboxylic acid, 1,2-pyrone-5-carboxylic acid, 1,2-pyrone-6-carboxylic acid, 1,4-pyrone-2-carboxylic acid, 1,4-pyrone-2,6-dicarboxylic acid, phenylalanine, α-phenyllocinnamic acid, N-phenylanthranilic acid, β-phenylglycidic acid, N-phenylglycine, -O-carboxylic acid, α-phenylcinnamic acid, phenylsuccinic acid, phenylacetic acid, O-phenylsalicyclic acid, β-phenyllactic acid, β-phenylhydroacrylic acid, phenylpyruvic acid, phenylpropiolic acid, γ-phenylbutyric acid, phenoxyacetic acid, phenol-2,4,6-tricarboxylic acid, d-fencholic acid, phthalanilic acid, phthalamide acid, phthalic acid, phthalonic acid, racemic acid, fumaric acid, brazilic acid, furancarboxylic acid, 2,5-furandicarboxylic acid, β-(2-furyl)acrylic acid, furylic acid, fluorobenzoic acid, fluoroacetic acid, propiolic acid, propionic acid, bromobenzoic acid, bromocinnamic acid, bromosuccinic acid, bromoacetic acid, bromofumaric acid, bromopropionic acid, bromomaleic acid, phloroglucincarboxylic acid, hexahydrosolicylic acid, hexahydroterephthalic acid, hesperetin acid, hemopyrrolecarboxylic acid, veratrum acid, pelargonic acid, benzylidenelactic acid, β-benzylidenepropionic acid, benzylidenemalonic acid, benzylbenzoic acid, benzylic acid, O-benzamidobenzoic acid, benzenetetracarboxylic acid, benzenetricarboxylic acid, benzenepentacarboxylic acid, α-benzoylacrylic acid, O-benzoylbenzoic acid, m-benzoylbenzoic acid, p-benzoylbenzoic acid, benzoylformic acid, benzoylglycolic acid, benzoylacetic acid, β-benzoylpropionic acid, 2,2′-benzophenonedicarboxylic acid, 4,4′-benzophenonedicarboxylic acid, gallic acid, homophthalic acid, formylbenzoic acid, margaric acid, maleic acid, malonic acid, mandelic acid, mannoic acid, myristic acid, muconic acid, lactic anhydride, mesaconic acid, mesitylenic acid, mesoxalic acid, mesotartaric acid, methacrylic acid, L-methionine, methionic acid, N-methylanthranilic acid, 5-methylisophthalic acid, α-methylcinnamic acid, β- methylcinnamic acid, methylsuccinic acid, methylmalonic acid, o-methoxybenzoic acid, m-methoxybenzoic acid, mellitic acid, melilotic acid, mercaptosuccinic acid, iodobenzoic acid, iodoacetic acid, iodopropionic acid, lauric acid, butyric acid, lysinoelaidic acid, ricinoleic acid, L-lysine, linolic acid, malic acid, levulinic acid, leucine, leucinic acid, etc. In these carboxylic acids, the higher the hydrophilicity is and the lower the molecular weight is, the easier the membrane formation is.

There are mentioned as example the organosulfur acids such as organic sulfonic acids, organic sulfinic acids and organic sulfenic acids and organophosphorus acids such as organic phosphonic acids and organic phosphinic acids, aminophenolsulfonic acid, aminobenzenesulfonic acid, anthraquinonesulfonic acid, isothionic acid, indigosulfonic acid, indigodisulfonic acid, indoxylsulfuric acid, ethanedisulfonic acid, ethanesulfonic acid, ethylsulfuric acid, xylenesulfonic acid, chlorobenzenesulfonic acid, diazobenzenesulfonic acid, 1,2-dihydroxy-7-anthraquinonesulfonic acid, 1,8-dihydroxy-3,6-naphthalenedisulfonic acid, d-camphor-10-sulfonic acid, sulfanilic acid, o-sulfamoylbenzoic acid, p-sulfamoylbenzoic acid, sulfobenzoic acid, sulfoacetic acid, 5-sulfosalicyclic acid, p-toluenesulfinic acid, toluenesulfonic acid, naphthalenesulfonic acid, 2-naphthol-3,6-disulfonic acid, 2-naphthol-6,8-disulfonic acid, naphtholsulfonic acid, 2-nitrophenol-4-sulfonic acid, nitrobenzenesulfonic acid, phenol-2,4-disulfonic acid, phenolsulfonic acid, flavianic acid, $\alpha$-bromo-d-camphor-$\beta$-sulfonic acid, $\alpha$-bromo-d-camphor-$\pi$-sulfonic acid, p-bromobenzenesulfonic acid, o-benzaldehydesulfonic acid, m-benzenedisulfonic acid, p-benzenedisulfonic acid, benzenesulfinic acid, benzenesulfonic acid, metanilic acid, methanesulfonic acid, methylsulfuric acid, dimethylphosphinic acid, phytic acid, benzenephosphonic acid, methanephosphonic aid, phenylphosphoric acid, benzenephosphonous acid, etc. These organosulfur and organophosphorous acids function similarly to carboxylic acids in membrane formation, though the former introduce a slight difficulty in controlling the droplet size and the droplets tend to become smaller than 20 $\mu$m in diameter, formation of the droplets larger than 20 $\mu$m being difficult.

The organic acids listed above seem to serve as aids for the formation of membrane, though the mechanism is yet to be elucidated. Since the number of organic acids effective for the membrane formation is very large, it is possible to select and blend those acids which are most suitable for the type of dispersed phase, diameter of droplets and strength of the membrane, thereby forming droplets coated with membrane having characteristic properties which are variable in a broad range.

The steps of procedure for coating minutely dispersed droplets with membrane according to this invention are described below.

At first, a water-containing solvent and a solvent substantially insoluble in the former solvent are provided for. To either or both of the solvents, is added one or more emulsifiers selected from nonionic emulsifiers such as polyvinyl alcohols, polysaccharides, modified polysaccharides, polyoxyethylene alkyl ethers, polyoxyethylene alkylphenyl ethers, polyoxyethylene alkyl esters, sorbitan alkyl esters, and polyoxyethylene sorbitan alkyl esters. Both solvents are mixed together to form a dispersion of minute droplets. The solvents usable in the process of this invention which are substantially insoluble in water-containing solvents include vegetable oils such as soybean oil and rapeseed oil; animal oils such as whale oil; mineral oils such as benzene, xylene and paraffins; and synthetic oils such as chlorinated paraffins, dibutyl phthalate and dioctyl adipate. Other usable solvents substantially insoluble in water-containing solvents are those capable of forming dispersed droplets, no matter whether the solvents in question are liquids or solids at room temperature. Emulsifiers suitable for use are polyvinyl alcohols having a saponification degree of 70% or more; polysaccharides such as starches; modified polysaccharides such as hydroxyethylcellulose and methylcellulose; polyoxyethylene alkyl ethers, polyoxyethylene alkylphenyl ethers, polyoxyethylene alkyl esters, sorbitan alkyl esters, and polyoxyethylene sorbitan alkyl esters such as polyoxyethylene lauryl ether, polyoxyethylene octylphenyl ether, polyoxyethylene stearate, sorbitan monopalmitate, and polyoxyethylene sorbitan monooleate. Other usable nonionic emulsifiers not belonging to the above classes but capable of maintaining stable dispersion of dispersed phase in an aforementioned solvent include glycerin propyleneglycol fatty acid esters and polyoxyethylene-polyoxypropylene cetyl ethers such as glyceryl monooleate and polyoxyethylene-polyoxypropylene cetyl alcohol ether.

The ratio of dispersion medium to dispersed phase is not specifically limited but can be selected so as to achieve the ultimately required ratio. As compared with the dispersion containing cationic or anionic emulsifiers, the dispersion containing nonionic emulsifiers are generally not so unstable against the addition of salts, solvents, or other contaminants and against the fluctuation of pH. However, the addition of such substances in large amounts can cause instability of the dispersion containing nonionic emulsifiers. It is desirable, therefore, that either solvent be composed of 50% or more, preferably 60% by weight or more of water. If the water content markedly deviates from the above range, the stability of the dispersion can be deteriorated. With the increase in the proportion of emulsifier in the dispersion, the viscosity of the dispersion tends to increase. If the proportion of emulsifier is further increased, dispersion becomes impossible. Addition of an emulsifier in excessive amounts should be avoided, because it is not only uneconomical but also affects adversely the dispersion of minute droplets. Therefore, in order to obtain a desirable result, the amount to be added of a nonionic emulsifier is 15% or less, preferably 0.2 to 10% by weight based on the dispersion. The selection of emulsifiers from a wide variety of nonionic emulsifiers, the estimation of a proper mixing ratio of the selected emulsifiers, and the estimation of the amount of mixed emulsifier to be added should be performed so as to maintain the dispersed droplets in stable dispersion by taking into account the proportion of both the dispersion medium and the dispersed phase.

The effect of organic acids shows substantially no difference whether they are added before the beginning of dispersion or after the completion of dispersion. When they are added before beginning of the dispersion, desirable results are obtained by adding to the dispersion medium an organic acid more soluble in said medium than in the disperse phase, or adding to the disperse phase an organic acid more soluble in said disperse phase, or adding to both the dispersion medium and the disperse phase an organic acid difficultly soluble in both. The amount of an organic acid to be added is generally 1 to 25% by weight based on disperse phase. If it is less than 1%, the membrane-forming resin becomes agglomerated, while if it is more than 25%, the membrane strength becomes too small to be of practical use. A preferred amount is 5 to 20% by weight. If the amount is 1 to 5%, both the resin and the membrane exist, whereas if the amount is 20 to 25%, the disperse phase tends to enter the dispersion medium. Being dependent on the type of disperse phase and the droplet diameter, the optimal amount of an organic acid should be suitably decided in each case.

As for the addition of membrane-forming materials, either or both of urea and formaldehyde can be added either before or after the formation of a dispersion of minute droplets of the disperse phase and also either before or after the addition of an organic acid to coat the dispersed droplets. However, more desirably they are added after the dispersion of minute droplets of disperse phase has been formed and an organic acid has been added. By such an order of procedure, it is possible to avoid the polymerization of membrane-forming materials to take place during the formation of a dispersion of disperse phase or during the addition of an organic acid. Being dependent on the added amount of membrane-forming materials, the membrane strength can be varied by adding a larger amount of the materials when a higher membrane strength is required or adding a smaller amount of the materials when a lower strength is required. The optimal amount of membrane-forming materials varies with the ratio of disperse phase to dispersion medium, the diameter of dispersed droplets and the amount of added organic acid. With the increase in the ratio of dispersion medium to dispersion phase and with the decrease in the diameter of dispersed droplets, larger amounts of the membrane-materials are required. The amount of membrane-forming materials can be increased with the increase in the added amount of an organic acid. For instance, when the amount of an organic acid added is about 9% by weight based on disperse phase, the amount to be added of membrane-forming materials is 5 to 30%, preferably 10 to 20% by weight based on disperse phase. If the amount of membrane-forming materials is less than the above range, the membrane strength becomes low, while if it exceeds the above range resin agglomerates tend to form in the dispersion. When the amount of an organic acid is increased to about 10%, no resin agglomerate will be formed even if the amount of membrane materials is increased by about 5%.

When one or more aromatic polyols (the term "aromatic polyols" as used herein means benzenediols, benzenetriols and toluenediols) are added before the formation of membrane, the viscosity of the dispersion can be kept more easily at a low level, the membrane strength is somewhat increased, and the formation of membrane proceeds more steadily even if the amount of membrane-forming materials is varied, compared with the case of urea-formaldehyde polycondensation without addition of aromatic polyols. Desirable results are obtained by the addition of resorcinol, pyrogallol, 1,2,4-benzenetriol, or orcinol, though other phenols have similar effects.

In the process of this invention, even if polyvinyl alcohol is used as emulsifier and an aromatic polyol is present, it is impossible to coat the droplet interface with membrane by coalescence between the polyvinyl alcohol and the aromatic polyol as disclosed in Japanese Patent Application Laid-open No. 57,892/73. Accordingly, it is imaginable that in the process of this invention, the function of aromatic polyols is to impart strength, flexibility and interfacial affinity to the urea-formaldehyde resin. It is presumable that the presence of an organic acid is responsible to the phenomenon that when polyvinyl alcohol, an aromatic polyol and an organic acid, an essential component in the process of this invention, are used in combination, there is no formation of the membrane by the interaction between polyvinyl alcohol and the aromatic polyol as described in Japanese Patent Application Laid-open No. 57,892/73. The formation of urea-formaldehyde resin at the droplet interface is impossible without the addition of an organic acid. Consequently, the addition of an aromatic polyol in excessive amount is inadequate for coating the droplet with membrane. A desirable amount is 150% by weight or less based on urea. If the amount exceeds 150%, the membrane strength is decreased too much for the practical use. When 10% or more of an aromatic polyol is added, the formation of membrane by polycondensation is difficult at low temperatures and a temperature of 40° C. or higher becomes necessary. It is desirable that the molar ratio of formaldehyde to the sum of urea, benzenediols, benzenetriols and toluenediols be larger than 1. If this ratio is decreased below about 1:1–1.2:1, the membrane formation becomes unsatisfactory. With the increase in the ratio of benzenepolyols to urea, the membrane formation tends to be improved even at a lower formaldehyde level.

After the addition of necessary components, the dispersion is stirred at a pH of about 6 or less to allow the polycondensation to proceed. The dispersed droplets can be coated with membrane in about 30 minutes to about 12 hours.

Although the membrane-coated droplets according to this invention can be prepared in various particle diameters required for particular uses, the coated droplets having diameters in the range of substantially 0.5 to 1,000 μm are most easily produced. The disperse phase coated with membrane can be used as solid particles on removing the dispersion medium by evaporation, filtration, or after removing the emulsifier by filtration, leaching or precipitation. It is also possible to utilize the dispersion in the form of slurry containing the dispersion medium. Coated droplets containing dyestuffs, adhesives, liquid crystals, surface coatings, pigments, pharmaceuticals, agricultural chemicals, perfumes, and the like can be prepared by dissolving or mixing these substances in or with the disperse phase. Such coated droplets can be utilized as elemental materials which can respond to pressure, temperature, static electricity, magnetism, or the lapse of time.

The invention is illustrated below in detail with reference to Examples, but the invention is not limited thereto.

EXAMPLE 1

A mixture was prepared by mixing together 200 g of a 1-phenyl-1-xylylethane solution containing 1% by weight of 3,3-bis(4-dimethylaminophenyl)-6-dimethylaminophthalide (hereinafter referred to as crystal violet lactone) dissolved therein and 200 g of a mixture prepared from equal quantities of an aqueous solution containing 10% by weight of hydroxyethylcellulose (having a viscosity of 20 to 30 cps, as measured on a 2% solution at 20° C.) and an aqueous solution containing 18% by weight of oxalic acid and adjusted to pH 3.5. The resulting mixture was emulsified by stirring to prepare a dispersion of droplets having a diameter of 4 to 10 μm. To the dispersion were added an aqueous solution containing 10 g of urea and 2 g of resorcinol dissolved in 100 g of water and 25 g of 35% formalin. The dispersion was stirred in a water bath at 60° C. for one hour to coat the droplets with membrane. To confirm the structure, the resulting dispersion was coated at a rate of 5 g/m² (on solids basis) on a paper material which had been undercoated at a rate of 5 g/m² (on dry basis) with a coating composition comprising 10 g of p-phenylphenolformaldehyde polycondensate (a mixture of polymers of 1–3 units), 100 g of aluminum hydroxide and 10 g of a styrene-butadiene copolymer (Dow 670 of Asahi-Dow Co.). The reflection optical density of the overcoating was 0.02, as measured with a densitometer ANA-82R of Tokyo Koden Co. through a green filter.

The coated paper placed on a table was rubbed vigorously with a stainless steel rod, 5 mm in diameter, and after 5 minutes the reflection optical density was found to be 0.35, indicating that color was developed by the reaction of crystal violet lactone with p-phenylphenol-formaldehyde polycondensate and that crystal violet and 1-phenyl-1-xylylethane had been coated with membrane. Thus, it was confirmed that the droplets were coated with membrane. The dispersion of droplets after the coating with membrane had been completed was examined under an optical microscope at a magnification of 500 and the droplets coated with membrane were recognized.

In the process of this invention, coating of the droplets cannot be achieved without the addition of suitable amounts of organic acids. To make this point evident, an experiment was carried out in the same manner as in Example 1, except that no organic acid was added. The experimental procedure and the results were as shown in the following Comparative Experiment 1.

COMPARATIVE EXPERIMENT 1

A mixture was prepared by mixing together 200 g of a 1-phenyl-1-xylylethane solution containing 1% by weight of crystal violet and 200 g of an aqueous solution prepared by adjusting 100 g of an aqueous solution containing 4% by weight of hydroxyethylcellulose (having a viscosity of 20 to 30 cps, as measured on a 2% solution at 20° C.) to pH 3.5 with about 0.1 g of oxalic acid. The resulting mixture was emulsified by stirring to prepare a dispersion of droplets having a diameter of 4 to 10 μm. To the dispersion were added an aqueous solution containing 10 g of urea and 2 g of resorcinol dissolved in 100 g of water and 25 g of 35% formalin. On being stirred in a water bath at 60° C. for one hour, the dispersion increased markedly in viscosity. In the same manner as in Example 1, the dispersion was coated on a paper material which had been undercoated with p-phenylphenol-formaldehyde polycondensate. Color was developed immediately and showed a reflection optical density of 0.31. On examination under an optical microscope at a magnification of 500, the dispersion showed agglomerates of the resin and droplets of the disperse phase, indicating that the droplets cannot be coated with membrane without the addition of a suitable amount of an organic acid.

EXAMPLE 2

A mixture was prepared by mixing together 150 g of a dioctyl adipate solution containing 1% by weight of crystal violet lactone and 200 g of an aqueous solution containing 4% by weight of polyvinyl alcohol (polymerization degree, 1700; saponification degree, 98.5%), 0.5% by weight of polyoxyethylene sorbitan monostearate (polymerization degree, 20) and 5% by weight of o-phthalic acid and having been adjusted to pH 3 with sodium hydroxide. The resulting mixture was emulsified by stirring to prepare a dispersion of droplets having a diameter of 1 to 6 μm. To the dispersion were added an aqueous solution containing 10 g of urea and 4 g of resorcinol dissolved in 100 g of water and 22 g of 35% formalin. The dispersion was stirred in a water bath at 45° C. for 2 hours to coat the droplets with membrane. To confirm the structure, the resulting dispersion was coated at a rate of 5 g/m² (on solids basis) on a paper material which had been undercoated at a rate of 10 g/m² (on solids basis) with a coating composition comprising 10 g of 3,5-di-tert-butylsalicylic acid, 100 g of zinc oxide and 10 g of a styrene-butadiene copolymer (Dow 670 of Asahi-Dow Co.). The reflection optical density was 0.02, as measured in the same manner as in Example 1.

The coated paper material placed on a table was rubbed vigorously with a stainless steel rod, 5 mm in diameter, and after 5 minutes the reflection optical density was found to be 0.42, indicating that color was developed by the reaction of crystal violet lactone with 3,5-di-tert-butylsalicylic acid and, hence, that crystal violet lactone and dioctyl adipate had been coated with membrane. Thus, it was confirmed that the droplets were coated with membrane. The dispersion of droplets after the coating with membrane has been completed was examined under an optical microscope at a magnification of 500 and the droplets coated with membrane were recognized.

In the process of this invention, coating of the droplets cannot be achieved unless the acid added was an organic acid. To make this point evident, an experiment was conducted in the same manner as in Example 2, except that the acid added was hydrochloric acid as an example of mineral acids. The results were as shown in the following Comparative Example 2. It was also found that it is impossible to coat the droplets with membrane by use of other mineral acids such as phosphoric acid and sulfuric acid.

COMPARATIVE EXAMPLE 2

A mixture was prepared by mixing together 150 g of a dioctyl adipate solution containing 1% by weight of crystal violet lactone and 200 g of an aqueous solution containing 4% by weight of polyvinyl alcohol (polymerization degree, 1700; saponification degree, 98.5%), and 0.5% by weight of polyoxyethylene sorbitan monostearate (polymerization degree, 20) and having been adjusted to pH 3 with hydrochloric acid (I), with 6 g of 35% hydrochloric acid and sodium hydroxide (II), or with 18 g of 35% hydrochloric acid and sodium hydroxide (III). The resulting mixture was emulsified by stirring to prepare three types of dispersions of droplets having a diameter of 1 to 6 μm. To each dispersion were added an aqueous solution containing 10 g of urea and 4 g of resorcinol dissolved in 100 g of water and 22 g of 35% formalin. On being stirred in a water bath at 45° C. for 2 hours, the dispersion increased markedly in viscosity. In the same manner as in Example 2, each dispersion was coated on a paper material which had been undercoated with 3,5-di-tert-butylsalicylic acid. The paper material showed a reflection density of 0.36 to 0.43. On examination under an optical microscope, the dispersion showed separate existence of agglomerates of the resin and droplets of the disperse phase, indicating that the droplets cannot be coated with membrane by the addition of hydrochloric acid in various amounts.

EXAMPLE 3

A mixture was prepared by mixing together 200 g of a xylene solution containing 5% by weight of a polycondensate (a mixture of polymers having a polymerization degree of 1 to 3) and 200 g of an aqueous solution containing 6% by weight of polyvinyl alcohol (polymerization degree, 1,700; saponification degree, 98.5%) dissolved in a 5% aqueous formic acid solution and having been adjusted to pH 2.0 with sodium hydroxide. The resulting mixture was emulsified by stirring to prepare a dispersion of droplets having a diameter of 5 to 20 µm. To the dispersion were added an aqueous solution containing 10 g of urea and 4 g of resorcinol dissolved in 100 g of water and 30 g of 35% formalin. The dispersion was stirred in a water bath at 50° C. for one hour to coat the droplets with membrane. To confirm the structure, the dispersion adjusted to pH 6.0 with sodium hydroxide was coated at a rate of 5 g/m$^2$ (on solids basis) on a paper material which had been undercoated at a rate of 1 g/m$^2$ (on solids basis) with an aqueous polyvinyl alcohol (polymerization degree, 1,700; saponification degree, 98.5%) solution containing 35% by weight of crystal violet lactone dispersed therein. The reflection optical density was 0.05, as measured in the same manner as in Example 1. The coated paper material placed on a table was rubbed vigorously with a stainless steel rod, 5 mm in diameter, and after five minute the reflection optical density was found to be 0.48, indicating that color was developed by the reaction of crystal violet lactone with the p-phenylphenolformaldehyde condensate and, hence, that the p-phenylphenol-formaldehyde condensate and the xylene were coated with membrane. Thus, it was confirmed that the droplets were coated with membrane. On examination of the dispersion of droplets after the coating with membrane had been completed under an optical microscope at a magnification of 500, the droplets coated with membrane were recognized.

The membrane covering the droplets according to this invention is formed of a urea-formaldehyde resin or a urea-aromatic polyol-formaldehyde resin. However, when polyvinyl alcohol was used as dispersant, there might arise a question whether or not the membrane is formed by the coalescence of PVA and polyhydroxyphenol (Japanese Patent Application Laid-open No. 57,892/73). In order to demonstrate that when a suitable amount of an organic acid required according to this invention is added, the membrane is not formed from polyvinyl alcohol and polyhydroxyphenol, an experiment shown in the following Comparative Example 3 was conducted in the same manner as in Example 3, except that no urea was added and the amount added of resorcinol was varied. Other polyhydroxyphenols disclosed in Japanese Patent Application Laid-open No. 57,892/73 were also failed to form the membrane.

COMPARATIVE EXAMPLE 3

A mixture was prepared from 200 g of a xylene solution containing 5% by weight of a p-phenylphenolformaldehyde polycondensate (a mixture of polymers having a polymerization degree of 1 to 3) and 200 g of an aqueous solution containing 6% by weight of polyvinyl alcohol (polymerization degree, 1,700; saponification degree of 98.5% dissolved in a 5% aqueous formic acid solution and having been adjusted to pH 2.0 with sodium hydroxide. The resulting mixture was emulsified by stirring to prepare a dispersion of droplets having a diameter of 5 to 20 µm. Three lots of such dispersions were prepared. To each dispersion were added an aqueous solution containing 4 g, 10 g or 22 g of resorcinol dissolved in 100 g of water and 30 g of 35% formalin. Each dispersion of droplets was heated with stirring in a water bath at 50° C. for 1 to 6 hours. The dispersion thus treated was coated on a paper material which had been undercoated with crystal violet lactone in the same manner as in Example 3. Color was developed immediately and showed a reflection density of 0.42 to 0.49 in each case. On examination of each dispersion under an optical microscope, only resin agglomerates of various sizes were observed, indicating that when an organic acid is present in a combination of polyvinyl alcohol, polyhydroxyphenol and formaline, coating of droplets by the coalescence of a polyhydroxyphenol and polyvinyl alcohol does not take place.

EXAMPLE 4

A mixture was prepared from 200 g of a 1-phenyl-1-xylylethane solution containing 1% by weight of crystal violet lactone dissolved therein and 180 g of a 20% by weight aqueous toluenesulfonic acid solution containing 6% by weight of hydroxypropylmethylcellulose (having a viscosity of 40 cps as measured on a 2% solution at 20° C.) dissolved therein and having been adjusted to pH 3.0 with sodium hydroxide. The resulting mixture was emulsified by stirring to prepare a dispersion of droplets having a diameter of 5 to 20 µm. To the dispersion were added an aqueous solution containing 9 g of urea and 3 g of resorcinol dissolved in 100 g of water and 25 g of 35% formalin. The resulting dispersion was stirred in a water bath at 60° C. for 2 hours to coat the droplets with membrane. To confirm the structure, the dispersion of droplets after the coating with membrane had been completed was coated on a paper material which had been undercoated with a p-phenylphenolformaldehyde polycondensate in the same manner as in Example 1. The reflection density was found to be 0.12. The coated paper material placed on a table was rubbed vigorously with a stainless steel rod, 5 mm in diameter and after 5 minutes the reflection density was found to be 0.34, indicating that the crystal violet lactone and the 1-phenyl-1-xylylethane were coated with membrane and, hence, that the droplets were coated with membrane. On examination of the dispersion of droplets, after the coating with membrane had been completed, under an optical microscope at a magnification of 250, the droplets coated with membrane were observed.

EXAMPLE 5

A mixture was prepared from 200 g of a 1-phenyl-1-xylylethane solution containing 1% by weight of crystal violet lactone dissolved therein and 200 g of an aqueous solution prepared by mixing together equal quantities of an aqueous solution containing 12% by weight of hydroxyethylcellulose (having a viscosity of 20 to 30 cps as measured on a 2% solution at 20° C.) and an aqueous solution containing 12% by weight of phenylphosphonic acid and (having been) adjusted to pH 2.8 with sodium hydroxide. The resulting mixture was emulsified by stirring to prepare a dispersion of droplets having a diameter of 1 to 10 µm. To the dispersion were added an aqueous solution containing 10 g of urea and 1 g of resorcinol dissolved in 100 g of water and 20 g of 35% formalin. The dispersion was stirred in a water bath at 65° C. for one hour to coat the droplets with membrane. To confirm the structure, the dispersion of droplets which had undergone the coating with membrane was coated on a paper material which had been undercoated with a p-phenylphenolformaldehyde polycondensate in the same manner as in Example 1. The reflection density was found to be 0.05. The coated paper placed on a table was rubbed vigorously with a stainless steel rod, 5 mm in diameter, and after 5 minutes, the reflection density was found to be 0.32, indicating that the crystal violet lactone and the p-phenylphenol-formaldehyde polycondensate were reacted to develop color and, hence, that crystal violet lactone and 1-phenyl-1-xylylethane had been coated with membrane. Thus, it was confirmed that the droplets were coated with membrane. The dispersion of droplets after the coating with membrane had been completed was examined under an optical microscope at a magnification of 500 to observe that the droplets were coated with membrane.

EXAMPLE 6

A mixture was prepared from 10 g of a 1-phenyl-1-xylylethane solution containing 1% by weight of crystal violet lactone and 8% by weight of abietic acid ($C_{20}H_{30}O_2$) and 10 g of an aqueous solution containing 6% by weight of hydroxypropylmethylcellulose (having a viscosity of 40 cps as measured on a 2% solution at 20° C.). The mixture was emulsified by stirring to prepare a dispersion of droplets having a diameter of 1 to 20 μm. To the dispersion which had been adjusted to pH 3.0 with hydrochloric acid and sodium hydroxide, were added an aqueous solution containing 0.5 g of urea and 0.2 g of resorcinol dissolved in 10 g of water and 1.2 g of 35% formalin. The dispersion was stirred in a water bath at 60° C. for 1 to 4 hours. The dispersion of droplets thus treated was coated on a paper material which had been coated with a p-phenylphenol-formaldehyde polycondensate in the same manner as in Example 1. The coated paper material showed a reflection density of 0.29. After having been rubbed vigorously with a stainless steel rod, 5 mm in diameter, on a table, the coated paper showed a reflection density of 0.31 after 5 minutes. On examination of the dispersion of droplets under an optical microscope at a magnification of 500, droplets coated with membrane were observed. From the above results it is presumable that the limit of total number of carbon atoms of the organic acid capable of effecting the coating of droplets with membrane is 20.

To demonstrate that the organic acids usable as an aid in membrane formation are those having a total number of carbon atoms of 20 or less, an experiment shown in the following Comparative Example 4 was conducted in the same manner as in Example 6, except that a different organic acid was used.

COMPARATIVE EXAMPLE 4

A mixture was prepared from 10 g of a 1-phenyl-1-xylylethane solution containing 1% by weight of crystal violet lactone and 8% by weight of erucic acid dissolved therein and 10 g of an aqueous solution containing 6% by weight of hydroxypropylmethylcellulose (having a viscosity of 40 cps as measured on a 2% solution at 20° C.). The mixture was emulsified by stirring to prepare a dispersion of droplets having a diameter of 1 to 20 μm. To the dispersion which had been adjusted to pH 3.0 with hydrochloric acid and sodium hydroxide, were added an aqueous solution containing 0.5 g of urea and 0.2 g of resorcinol and 1.2 g of 35% formalin. The resulting dispersion was stirred in a water bath at 60° C. for 1 to 4 hours. The reflection density of the resulting dispersion coated on a paper material in the same manner as in Example 6 and not rubbed with a stainless steel rod was 0.28. On examination of the dispersion of droplets under an optical microscope at a magnification of 500, both membrane-coated droplets and uncoated droplets were observed, indicating that the coating with membrane was not satisfactory when an organic acid having carbon atoms more 20 was used.

EXAMPLE 7

An experiment was conducted in a manner similar to that in Example 1, except that urea was not used.

A mixture was prepared from 200 g of a 1-phenyl-1-xylylethane solution containing 1% by weight of crystal violet lactone and 200 g of an aqueous solution prepared by mixing together equal quantities of an aqueous solution containing 10% by weight of hydroxyethylcellulose (having a viscosity of 20 to 30 cps as measured on a 2% solution at 20° C.) and an aqueous solution containing 18% by weight of oxalic acid and adjusted to pH 3.5 with sodium hydroxide. The mixture was emulsified by stirring to prepare a dispersion of droplets having a diameter of 4 to 10 μm. To the dispersion were added an aqueous solution of 10 g of urea dissolved in 100 g of water and 25 g of 35% formalin. The dispersion of droplets was stirred in a water bath at 50° C. for 1 to 4 hours. The dispersion was slightly increased in viscosity. The resulting dispersion was diluted with 25% of water and coated on a paper material which had been undercoated with a p-phenylphenol-formaldehyde polycondensate. The reflection density was found to be 0.16. The coated paper material placed on a table was rubbed vigorously with a stainless steel rod, 5 mm in diameter, and after 5 minutes the reflection density was found to be 0.21. On examination of the dispersion of droplets under an optical microscope at a magnification of 500, droplets coated with membrane were observed.

From Examples 1 and 7, it seems that the addition of aromatic polyols is effective in increasing the strength and flexibility of the membrane.

What is claimed is:

1. A process for coating dispersed minute droplets with membrane by polycondensation, which comprises mixing together a solvent containing a nonionic emulsifier and a solvent substantially insoluble in the former solvent, thereby forming a dispersion of minute droplets, the dispersion medium of the dispersion being a water-containing solvent and the nonionic emulsifier being present in an amount of 15% by weight or less based on the dispersion; adding one or more organic acids soluble in said dispersion; adding urea and formaldehyde to said dispersion; adding an aromatic polyol to said dispersion; and effecting polycondensation to form membrane around the dispersed droplets in said dispersion.

2. A process according to claim 1, wherein the emulsifier comprises one or more members selected from the group consisting of polyvinyl alcohols, polysaccharides and modified products thereof, polyoxyethylene alkyl ethers, polyoxyethylene phenol ethers, polyoxyethylene alkyl esters, sorbitan alkyl esters, and polyoxyethylene sorbitan alkyl esters.

3. A process according to claim 1, wherein the organic acid soluble in the dispersion comprises one or more members selected from the group consisting of carboxylic acids; organosulfur acids and organophosphorus acids.

4. A process according to claim 1, wherein the organic acid is a carboxylic acid having 1 to 19 carbon atoms per carboxyl group and the total number of carbon atoms is up to 20.

5. A process according to claim 1, wherein the carboxylic acid is added in an amount of 1 to 25% by weight based on the solvent forming the dispersed phase.

6. A process according to claim 5 wherein the nonionic emulsifier is present in an amount of 0.02 to 10% by weight based on the dispersion.

7. A process according to claim 1, wherein the aromatic polyol of claim 1 comprises at least one member selected from the group consisting of benzenediols, benzenetriols and toluenediols.

* * * * *